(12) United States Patent
Peter et al.

(10) Patent No.: US 9,262,763 B2
(45) Date of Patent: Feb. 16, 2016

(54) PROVIDING ATTACHMENT-BASED DATA INPUT AND OUTPUT

(75) Inventors: Markus A. Peter, St. Leon-Rot (DE); Shabana Ansari, Bangalore (IN); Peter Eberlein, Malsch (DE); Markus Schmidt-Karaca, Heidelberg (DE)

(73) Assignee: SAP SE, Walldorf (DE)

( * ) Notice: Subject to any disclaimer, the term of this patent is extended or adjusted under 35 U.S.C. 154(b) by 1559 days.

(21) Appl. No.: 11/540,470

(22) Filed: Sep. 29, 2006

(65) Prior Publication Data

US 2008/0082575 A1   Apr. 3, 2008

(51) Int. Cl.
- *G06F 17/30* (2006.01)
- *G06F 7/00* (2006.01)
- *G06Q 30/02* (2012.01)
- *G06Q 10/10* (2012.01)

(52) U.S. Cl.
CPC .............. *G06Q 30/02* (2013.01); *G06Q 10/10* (2013.01)

(58) Field of Classification Search
None
See application file for complete search history.

(56) References Cited

U.S. PATENT DOCUMENTS

| | | | |
|---|---|---|---|
| 6,317,750 B1 * | 11/2001 | Tortolani et al. | |
| 6,427,150 B1 * | 7/2002 | Oashi et al. | |
| 6,961,728 B2 * | 11/2005 | Wynblatt et al. | |
| 2003/0037061 A1 * | 2/2003 | Sastri et al. | 707/103 R |
| 2003/0120672 A1 * | 6/2003 | Bingham | 707/100 |
| 2005/0091268 A1 * | 4/2005 | Meyer et al. | 707/103 R |
| 2005/0203949 A1 * | 9/2005 | Cabrera et al. | 707/103 R |
| 2005/0227218 A1 * | 10/2005 | Mehta et al. | 434/350 |
| 2006/0053195 A1 * | 3/2006 | Schneider et al. | 709/204 |
| 2006/0149781 A1 * | 7/2006 | Blankinship | 707/103 R |
| 2006/0184571 A1 * | 8/2006 | Liu et al. | 707/103 R |

OTHER PUBLICATIONS

George R S Weir "Helping Out by Helping in: Approaches to Electronic Submission of Coursework" 2001;In: 2nd International Conference on Technology in Teaching and Learning in Higher Education; pp. 1-7.*

* cited by examiner

*Primary Examiner* — Apu Mofiz
*Assistant Examiner* — Jermaine Mincey
(74) *Attorney, Agent, or Firm* — Fish & Richardson P.C.

(57) ABSTRACT

Various embodiments of systems, methods, and software provide attachment-based mass data input and output for a distributed application system. Software for interactive, attachment-based data management may comprise computer readable instructions operable when executed to receive a request from a logically remote client via a network interface, where the request indicates a data file and a business object associated with a business application. The business object is then updated with a message in a format associated with the business application based on the data file. The data file is then stored in a repository and a dependent object (included in, or referenced by, or otherwise associated with the business object) is then updated with a logical location of the data file in the repository.

23 Claims, 7 Drawing Sheets

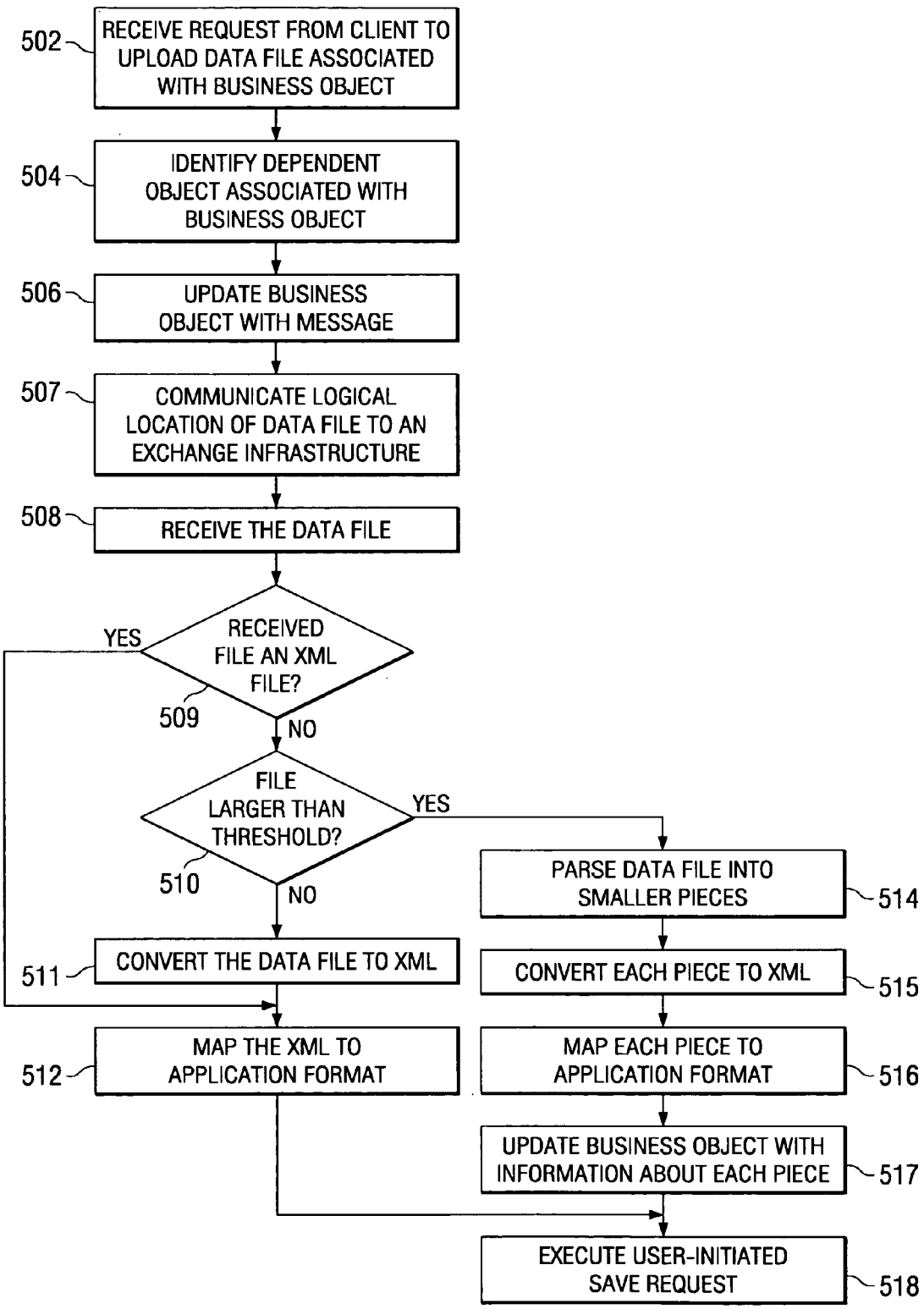

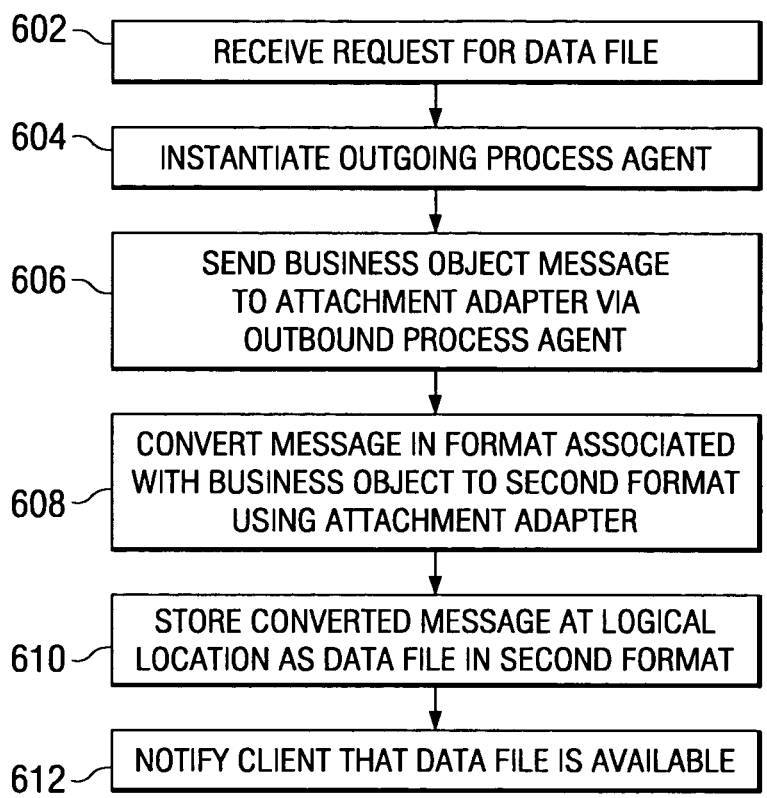
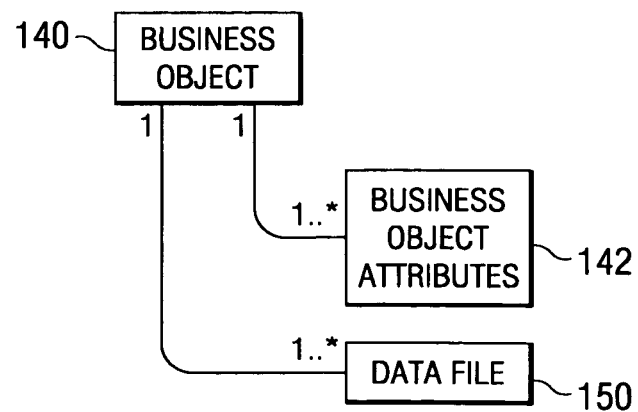

PROVIDING ATTACHMENT-BASED DATA INPUT AND OUTPUT

TECHNICAL FIELD

This disclosure relates to computer systems and methods and, more particularly, to methods, systems, and software for providing attachment-based data input and output.

BACKGROUND

Business applications often have to support or utilize the input of large amounts of data based on files or the extraction of large amounts of data by having the application generate files. In networked or distributed architectures, the end user interface is executed on workstations different from the server application, potentially with firewalls or other security between that may restrict possible communication channels between front end and server. In such situations, the developer, administrator, or information manager may identify several considerations such as the transfer of a copy of the data file to or from the application server and from or to the user's local file system, the user interfaces for file transfer, reasonable access permissions to files generated on the server, and the organization of the files on the server.

For example, current user triggered file-based data input into client-server application typically begins when the user enters the location of the file to be uploaded into a special user interface of the application and executes some action to start the upload. In this example, the application system either pulls the file from the location (where the application normally has or requests access to the file in the original location) or the client (via the local front end) actively transfers the file to the server application. In certain cases, a special file transfer mechanism (such as FTP, HTTP PUT, XML message exchange) may be used instead of the channel used for normal user interface-server application communication. The server application may then process the file once it is received. Often, the end user has no means of looking at the file being processed within the application. Moreover, the file may be persisted within the application during processing, but not normally in such a way that an end user can access it. Once the file is successfully processed by the business application, it is typically deleted or moved to a location often unknown or inaccessible to non-expert end users.

Conventional mass-data output into a file typically works in a similar way. For example, in distributed systems, the generated file is usually stored somewhere in the server application and may be downloaded using a user interface for end users. This user interface is often decoupled from the application's standard user interface to read or maintain object data. The organization and access permission concept for the generated files is then devised, which may be challenging for hosted applications.

SUMMARY

The disclosure provides various embodiments of systems, methods, and software for providing attachment-based data input and output for a distributed application system. For example, software for interactive, attachment-based data management may comprise computer readable instructions operable when executed to receive a request from a logically remote client via a network interface, where the request indicates a data file and a business object associated with a business application. The business object is then updated with a message in a format associated with the business application based on the data file. The data file is then stored in a, perhaps logically remote, repository and a dependent object associated with the business object is then updated with a logical location of the data file in the repository.

In another example, software for interactive, attachment-based data management comprises computer readable instructions and is operable when executed to automatically identify a business object in a business application based on a received request. This request may come from a local or remote client, a user, a component logically related to the software, or any other suitable source. The software then instantiates a dependent object using the business object, with the dependent object storing a logical location for a data file. The software converts a business object message in a format associated with the business application to a second format and stores the converted message at the logical location as the data file in the second format.

The foregoing example software—as well as other disclosed methods—may also be computer implementable methods. Moreover some or all of these aspects may be further included in respective systems for providing attachment-based data input and output and other enterprise software. The details of these and other aspects and embodiments of the disclosure are set forth in the accompanying drawings and the description below. Other features, objects, and advantages of the various embodiments will be apparent from the description and drawings, as well as from the claims.

DESCRIPTION OF DRAWINGS

FIG. 5 is a flowchart illustrating an example method for performing a file upload;

FIG. 6 is a flowchart illustrating an example method for performing a file download;

FIG. 7 illustrates example relationships between the business object and the data file in the system of FIG. 1.

DETAILED DESCRIPTION

Figure 1:
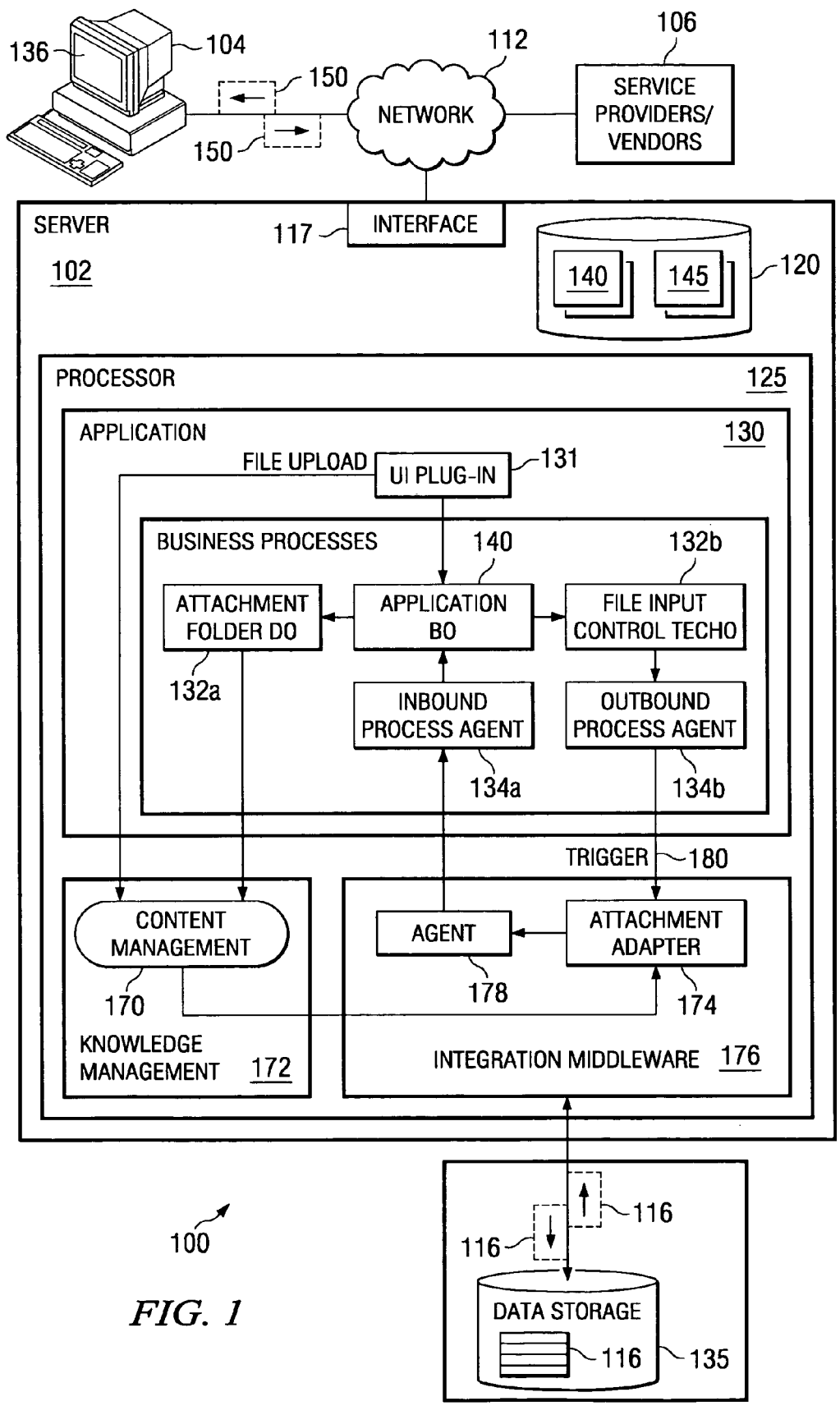
FIG. 1 illustrates an example system for processing attachment-based file uploads in accordance with one embodiment of the present disclosure.

FIG. 1 illustrates an example system 100 for managing or otherwise providing attachment-based data input and output for a distributed application system. Generally, system 100 uses this attachment-based data input and output to enable data uploads to, and data downloads from, business application 130 in formats not typically associated with the application 130 and using communication channels and protocols associated with that application. More specifically, each file containing data to be input or output can be treated as an attachment to (or other integral or dependent part of) an existing instance of business objects 140 for which data is updated or extracted as part of the objects. File transfer from the end user's front end file system into the backend system, or vice versa, can thus be handled by application 130 similar to the transfer of other attachments. Moreover, this file upload may be more easily integrated into the front-end of the business application 130 and may be more quickly uploaded via streaming. In other words, system 100 may allow for one point of file input (at least per receiving application component) where the particular user doesn't have to know which input folder to use and where the configuration effort may be reduced.

For example, in the case of data input, the end user can select an instance of the class of objects for which data shall be loaded. The user may then create an attachment to the object instance and upload the file into the system, as the attachment's content. Either immediately or at a later, perhaps scheduled, time, the end user executes some action that triggers processing the file in background. Such actions can include a "save" action in a transactional system, a dedicated action to start processing the file, or some other action that the backend system might interpret or understand as indicating that the file should be processed. Often, the file can remain available as an attachment to the object instance. In some cases, system 100 may support multiple file formats for data input and can detect a concrete file's format—typically based on the context provided by the object instance to which the file is attached and by searching for key words within the file content. In another example, in the case of data output, the end user may execute or request an action that leads to the generation of a file in a background process. The generated file can be stored as an attachment to the object instance initially chosen by the end user. At any suitable time later, the end user can search for or request the right object instance (or the user can be actively notified) and can perform any suitable action thereafter including, for example, transferring the attachment to his local file system or sending it to another person via email. System 100 may enable tracking the progress of processing a file in the background using any appropriate status indication at the attachment or object instance level.

In general, system 100 allows external data files to be treated as an integral part of the application 130's object model and thus part of the application 130's object data. This storage of the data files within the application system often allows decoupling of the file processing (either for data update or extraction) from file transfer (up- or download). Input processing can be repeated without new file transfer and file extraction can be repeated without new file generation. Moreover, treating the data files as attachments to object instances may allow for an integrated view on the data. Put another way, access to the files can be integrated into the standard user interface and API to read or maintain object instances and into the object access permission concept. Accordingly, the files may be implicitly organized in a similar way as the object instances. This similar organization may facilitate hosted application scenarios. In data input cases where the file content serves to update a single, but large object instance (e.g. an entire product catalog), system 100 may reduce uploads that unintentionally lead to the creation of additional, unwanted object instances, perhaps by requiring an object instance to exist prior to the upload.

In one example implementation, a cash manager may receive payment files from a secure bank connection, which can then be stored on the cash manager's desktop. Using a standard interface of application 130 that treats the files as object-based attachments, the cash manager can upload them to the system, triggering automatic creation of payment advices, incoming checks, back statements, and so forth. During the process, system 100 can handle the corresponding data as tightly-coupled object instances, thereby exploiting the information already within the system that defines the object's attributes, operations, files, and such. In another example, a payment run (say, within the payment application) may produce outgoing checks or payment files from bank payment orders. The cash manager may select these objects as attachments to be downloaded from system 100 to the cash manager's desktop. Once the attachments are processed, the cash manager can then easily transfer them from the desktop to a secure bank connection.

In another example implementation, system 100 may create or receive one or more files as attachments containing sales information for a particular global customer. In this example, system 100 may provide business objects and process agents to assist the client 104 in managing the flow of such attachments into and out of system 100. Particularly, the business object and process components may enable system 100 to treat the attachments as instances of business objects defined by the system. By treating attachments as business object instances, the applications 130 can exploit properties provided by the associated business object definitions.

Referring to illustrated FIG. 1, the applications 130 are hosted on a server 102 providing various business processes and functionality to a client 104. System 100 is typically a distributed client/server system that spans one or more networks such as 112. As mentioned above, rather than being delivered as packaged software, system 100 may represent a hosted solution, often for an enterprise or small business, that may scale cost-effectively and help drive faster adoption. In this case, portions of the hosted solution may be developed by a first entity, while other components are developed by a second entity. These entities may participate in any suitable form of revenue or cost sharing as appropriate. Moreover, the processes or activities of the hosted solution may be distribution amongst these entities and their respective components. For example, system 100 may implement a sales tracking system for global customers. In some embodiments, data may be communicated or stored in an encrypted format such as, for example, using the standard TNG encryption algorithm. This encrypted communication may be between the user and the host or amongst various components of the host. Further, system 100 may store data (e.g., user, transaction, service provider, and such) at a relatively central location using a wide area network (WAN), while concurrently maintaining local data at the user's site for redundancy and to allow processing during downtime. Alternatively, system 100 may be in a dedicated enterprise environment—across a local area network (over LAN) or subnet—or any other suitable environment without departing from the scope of this disclosure.

Turning to the illustrated embodiment, system 100 includes or is communicably coupled with server 102 and one or more clients 104, at least some of which communicate across network 112. Server 102 comprises an electronic computing device operable to receive, transmit, process and store data associated with system 100. Generally, FIG. 1 provides merely one example of computers that may be used with the disclosure. Each computer is generally intended to encompass any suitable processing device. For example, although FIG. 1 illustrates one server 102 that may be used with the disclosure, system 100 can be implemented using computers other than servers, as well as a server pool. Indeed, server 102 may be any computer or processing device such as, for example, a blade server, general-purpose personal computer (PC), Macintosh, workstation, Unix-based computer, or any other suitable device. In other words, the present disclosure contemplates computers other than general purpose computers as well as computers without conventional operating systems.

Server 102 may be adapted to execute any operating system including Linux, UNIX, Windows Server, or any other suitable operating system. According to one embodiment, server 102 may also include or be communicably coupled with a web server and/or a mail server. As illustrated, server 102 is communicably coupled with a remote repository 135 over a portion of network 112. In this example, repository 135 may be physically local to server 102, but logically separated from the business functionality based on security settings or concerns, protocols or formats, virtual LAN or subnet, and/or other static or runtime factors. Repository 135 is any intra-enterprise, inter-enterprise, regional, nationwide, or substantially national electronic storage facility, data processing center, or archive that allows for one or a plurality of clients 104 (as well as servers 102) to dynamically store and retrieve data elements 116, which may include any business, enterprise, application or other transaction data and metadata (including one or all of the uploaded or generated data files). Each data element 116 includes some form of transaction data and, perhaps, other related data such as foreign keys. Repository 135 may be a central database communicably coupled with one or more servers 102 and clients 104 via a virtual private network (VPN), SSH (Secure Shell) tunnel, or other secure network connection. Repository 135 may be physically or logically located at any appropriate location including in one of the example enterprises or off-shore, so long as it remains operable to store information associated with system 100 and communicate such data to at least a subset of a plurality of clients 104 (perhaps via server 102). For example, the repository may be physically local, but logically remote from the particular business objects 140 or application 130. In this example, logically remote may further include being stored within the same database or other data repository, but in separate database tables or schemas. Often, such an implementation may result in increased operational or processing efficiency.

As a possible supplement to or as a portion of repository 135, illustrated server 102 includes local memory 120. Memory 120 may include any memory or database module and may take the form of volatile or non-volatile memory including, without limitation, magnetic media, optical media, random access memory (RAM), read-only memory (ROM), removable media, or any other suitable local or remote memory component. Illustrated memory 120 includes business objects 140 and user context profiles 145. It will be understood that although illustrated as resident in memory 120, objects 140 and profiles 145 may instead be referenced by memory 120. But memory 120 may also include any other appropriate data such as VPN applications or services, firewall policies, a security or access log, print or other reporting files, HTML files or templates, data classes or object interfaces, child software applications or sub-systems, and others.

Illustrated business objects 140 include any business process, web service, applet, module, webpage, front-end element, development object or class, or any other software that a developer can utilize, reference, or select in the front-end of any business application and, when appropriate, attach data to. For example, a business object 140 may be provided to users as an invokable web service. System 100 may use these web services to offer an interface to users for viewing or requesting business data. In another example, a business object 140 may be an underlying business process that (directly or via some other component or object) receives input from the user via the front-end or provides output to the user via the front-end. In some embodiments, business objects 140 (or pointers thereto) may be stored in one or more tables in a relational database described in terms of SQL statements or scripts. In another embodiment, business objects 140 may be formatted, stored, or defined as various data structures in text files, eXtensible Markup Language (XML) documents, Virtual Storage Access Method (VSAM) files, flat files, Btrieve files, comma-separated value (CSV) files, internal variables, or one or more libraries. In short, business objects 140 (or their definitions) may be persisted in one table or file or a plurality of tables or files stored on one computer or across a plurality of computers in any appropriate format. Moreover, business objects 140 may be stored a run-time memory in any suitable format after being instantiated. Indeed, some or all of business objects 140 may be local or remote without departing from the scope of this disclosure so long as the particular object 140 can be linked to, reference, or otherwise be associated with the data file 150.

Business objects 140 may include, link, or reference dependent objects, such as attachment folder dependent object 132a. Generally, dependent objects are re-usable business object building blocks, including model, implementation (including storage) and potentially corresponding user interface building blocks. These building blocks often allow modeling and implementing non-trivial business object parts once even if they appear repeatedly across the various business objects 140. In other words, dependent objects may allow easy re-use of managing the file links and the associated GUI in several business objects. In certain implementations, each instance of the dependent object is generally an integral part (or component) of a business object instance and therefore may not exist independently from this "hosting" business object instance. For example, the business application may include an address dependent object that appears in or is referenced by various business documents (e.g. sales order, purchase order, and so forth) and even perhaps in several roles within each document (such as the sold-to, ship-to, bill-to address, and so on). In this example, the address is not a business object because these addresses are rarely without relation to a business partner, a business document, or other business object 140. Again, another example is the attachment folder dependent object that often comprises a re-usable building block to manage and organize files attached to business object instances.

For example, FIG. 7 illustrates example relationships between a business object 140, the data file 150, and its related attributes. Specifically, it helps illustrate file content multiplicity. For example, in this representation, the business object 140 can have business object attributes 142. This relationship can be one to many, as indicated by the numbers (e.g., the marking "1 . . . *") labeling the lines between the entities, meaning that one or more attributes 142 can exist for each business object 140. A similar relationship can exist between a business object 140 and its corresponding one or more files 150. This representation of a business object includes one or more files. For example, if the business object is an employee, one or associated files can contain such data as an employee photo or a resume.

The file format of the data file 150 can be flat, structured, extensible, or any other suitable format with various extensions. In some cases, the flat file can be uploaded and attached "as is" or without modification. The example XML file can often be directly mapped to the receiver interfaces and thus tied logically to a corresponding business object 140. Conversely, the structured file, such as an Excel or CSV-formatted file, may be converted to XML before being mapped for easier or inherent processing. Large files may have to be split before processing depending on physical capabilities of the system 100 or relevant component thereof. Regardless of the number of files, the system 100 can often automatically correlate file parts so that, logically, just one message is transmitted.

In some implementations, there may be a one-to-one relationship between a file and a business object. In this case, a file being uploaded or downloaded may contain a single business object, and the business object 140 may have one or more business object attributes. Before the file 150 is uploaded or generated (perhaps for later download), the business object instance will typically be created based on the data of the file. After the business object instance creation process, the file becomes obsolete. But, in certain situations, there may be requirements to keep the original file for archiving, auditing or security reasons. The decision whether the file is kept after the upload or download can be automatically controlled or determined by application 130. In case of file download, one business object instance can be represented by a single file. In other implementations, the business object 140 may be represented by multiple files or a file may be associated with multiple business objects 140. In either case, each business object 140 may have one or more attributes. In addition, processing the files (uploading or downloading) may automatically occur logically as a single message because the system 100 maintains file-to-business object mapping information.

Returning to the embodiment illustrated in FIG. 1, memory 120 further includes example user context profiles 145. When present, such user context profile 145 may aid system 100 in identifying or determining the user context of the particular user. More specifically, user context profile 145 may include rules, algorithms, tables, or other instructions to identify certain user context elements—or individual datums or other information helping define or describe the user's context—such as a logical address (an IP address or subnet), a physical location of the user, a user role, a department associated with the user, a particular company or enterprise, an industry associated with such a company or enterprise, a user identifier, a project, historical or current user actions, user preferences, or any other suitable contextual user element or contextual business element. For example, the user context profile 145 may help application 130 determine the role of the user based on the user's login ID. It should be understood that this disclosure contemplates the term "based on" to include "based, at least in part, on." In another example, the user context profile may help application 130 determine the industry or department of the particular user based on the subnet identifier of client 104, which may identify the enterprise of logical network including the user. In this example, the user may login through a portal to customize his list of context elements to ensure that appropriate or more useful presentation is displayed on his GUI 136 when he requests data. Moreover, server 102 may automatically determine the user's contextual information and store such information in the particular user context profile 145 for subsequent use. As with business objects 140, user context profiles 145 may be stored in any suitable format, such as an XML file or a SQL table, in one or more appropriate local or remote locations. For example, server 102 may store a plurality of records that are keyed off of the particular client 104, the respective user, and the context type or combination identifier. These example records would then include other information such as the business or user context combination, foreign keys, or other usable data.

Server 102 also includes processor 125. Processor 125 executes instructions and manipulates data to perform the operations of server 102 such as, for example, a central processing unit (CPU), a blade, an application specific integrated circuit (ASIC), or a field-programmable gate array (FPGA). Although FIG. 1 illustrates a single processor 125 in server 102, multiple processors 125 may be used according to particular needs and reference to processor 125 is meant to include multiple processors 125 where applicable. In the illustrated embodiment, processor 125 executes a business application 130.

At a high level, the application 130 is operable to receive and/or send data files 150 from local or remote users and present at least a subset of the results to the particular user via an interface. In certain cases, system 100 may implement a composite application 130. For example, illustrated application 130 may comprise application components 132*a-b* that are communicably coupled with a variety of other modules 134*a-b*, each typically operable to provide specialized functionality in support of attachment-based file uploads and downloads. Regardless of the particular implementation, "software" may include software, firmware, wired or programmed hardware, or any combination thereof as appropriate. Indeed, application 130 may be written or described in any appropriate computer language including C, C++, Java, J#, Visual Basic, assembler, Perl, any suitable version of 4GL, as well as others. For example, returning to the above described composite application, the composite application portions may be implemented as Enterprise Java Beans (EJBs) or the design-time components may have the ability to generate run-time implementations into different platforms, such as J2EE (Java 2 Platform, Enterprise Edition), ABAP (Advanced Business Application Programming) objects, or Microsoft's .NET. It will be understood that while application 130 is illustrated in FIG. 1 as including a number of submodules 131, 132*a-b* and 134*a-b*, application 130 may be a hosted solution represented by numerous GUI screens (as in FIG. 8) or may instead be a single multi-tasked module that implements the various features and functionality through various objects, methods, or other processes. Further, while illustrated as internal to server 102, one or more processes associated with application 130 may be stored, referenced, or executed remotely. For example, a portion of application 130 may be a web service that is remotely called, while another portion of application 130 may be an interface object bundled for processing at remote client 104. In another example, the majority of processes or modules may reside—or processing takes place—on client 104. Moreover, application 130 may be a child or sub-module of another software module or enterprise application (not illustrated) without departing from the scope of this disclosure.

In one implementation, a file upload using the present disclosure can commence when a user selects a file to be uploaded. For example, the user may select a file named "Emplyees_W-4s.XLS" that contains W-4 elections of various employees. Identification and selection of the file may occur via the GUI 136 on the client 104. The associated file is directly uploaded to the content management service 170 of the knowledge management component 172. This process perhaps makes use of a decoupled or distributed attachment service, as described below. An attachment folder plug-in for the context component 131 handles the file transfer from the user's desktop to the backend of the knowledge management component 172. The application business object 140 gets the file's logical location from the attachment folder data object component 132*a* and passes it to the file input control technical object 132*b*. For example, in this step, the business object 140 passes the logical location of "Emplyees_W-4s.XLS" to the file input control technical object 132*b*. This logical location may include an absolute Uniform Resource Locator (URL), a relative URL, or any other identifier or address of where the file is located within the logical (and/or physical) locations. The logical location may also indicate a particular protocol, communication channel or port, and any other useful information. The file input control technical object 132b then starts the outbound process agent 134b which sends a trigger message with the file's URL to an attachment adapter 174 in an enterprise application integration middleware 176. Using the URL, the attachment adapter 174 reads the file containing the employee W-4 information from the content management service 170. The attachment adapter 174 sends a message containing the XML-formatted information to enterprise application integration middleware 176, perhaps via agent 178.

Generally, enterprise application integration middleware 175 may be any tool or software that can centrally manage or facilitate management of data conversion (especially XML file conversion) logic to allow mediating between different interfaces. In certain embodiments, enterprise application integration middleware 176 integrates different versions of systems implemented on different platforms, such as Java, ABAP, and so forth. In other words, the enterprise application integration middleware 176 generally allows for the exchange of information from a first object, component, or system to a second object, component, or system over network 112 by using standardized interfaces. The enterprise application integration middleware 176 is often based on an open architecture and makes use of open standards, such as XML and Java environments. The enterprise application integration middleware 176 can offer services that are useful in a heterogeneous and complex system landscape. In particular, the enterprise application integration middleware 176 offers a runtime infrastructure for message exchange, configuration options for managing business processes and message flow, and options for transforming message contents between the sender and receiver systems. These standardized interfaces may be derived according to defined rules using an overall object model. In other words, the integration middleware agent 178 maps the message to the business process repository 130. The inbound process agent 134a then updates the application business object 140 with the data, updating and creating additional business objects 200 as applicable.

During a file upload, the structured files can be split, if necessary, and converted to XML (or another format compatible with, processable by, or otherwise associated with the application) by an attachment adapter 174 to make them consumable by the integration middleware agent 178. System 100 can base its decision to split a file on a predefined file size, system capabilities or requirements, security settings, or other one or more thresholds. Splitting logic can further depend on the various file formats that may be detectable by system 100. In some implementations, the splitting processing may include a format conversion to reformat data from a legacy system or earlier application to a format associated with system 100, such as XML. It will be understood that while the following description may refer to this format as XML, it may instead by any other extensible or structured file format that meets the appropriate criteria for application 130.

Business scenarios using file input may similarly trigger the processing of the incoming file in the enterprise application integration middleware 176. For example, the file input control technical object 132b can be provided as a reuse object in the foundation layer for that purpose. Its outbound process agent 134b may initiate a file input notification message to the integration middleware agent 178 via the attachment adapter 174. This object message may include i) attachment link information (facilitating the passing of links to single documents or folders); ii) receiver business object information; and iii) the sender business object instance ID. Of course, the message may include other data and information in place of or in addition to the forgoing data.

Each time the file 150 is uploaded, the file input control technical object 132b may be instantiated to create a new or updated instance. The instance of file input control technical object 132b is often transient, with its lifetime ending when a trigger message is sent. Although the file input control technical object 132b is transient, there may be some requirements relating to process integration persistence. For example, if the file upload is triggered for a second time, the outbound process agent 134b may detect the situation and react accordingly such as, for example, implementing multiple creations of the same instances. Using process integration persistence rules, the system may not store the ID of the file input control technical object 132b, but would instead store the ID of the business object instance that has initiated the process.

In some implementations, the architecture can be nearly symmetrical for file input and output and may be tied to a work center on system 100. In the case of the file download, the attachment adapter 174 converts the XML (or other format) messages from the integration middleware agent 178 into the target output format. For example, the user can open the work center for the creation and maintenance of the business object instance. The user's selection is passed through an interface 117 to the context component 131 of the work center. An attachment folder dependent object 132a is attached to the business object. The context component 131 provides an attachment pane by which the user the can upload the file from his desktop. The context component 131 uploads the file to the content management service 170 of the knowledge management component 172 into a folder that is associated with the instance of the attachment folder data object 132a.

The business object instance requests the URL of the knowledge management component 172 folder where the file is stored via the enterprise services infrastructure interface of the business object/data object. The business object instantiates an instance of a file input control technical object 132b. The URL is passed to the file input trigger 180 together with the object ID of the business object instance.

When the user saves the file 150, the outbound process agents or other dependent objects can be invoked. For example, the outbound process agent 134b may be invoked by the file input control technical object 132b and may create an asynchronous trigger message and send it to the inbound interface of the attachment adapter 174. The trigger message may contain any suitable information such as, for example, i) the URL or other logical location of the file 150 (perhaps to enable the attachment adapter 174 to locate the file in the knowledge management component 172); ii) the instance ID of the sending business object (perhaps to enable the association of newly created business object instances to associate to the initiating business object instance); iii) the destination business object (perhaps to enable mapping to the correct inbound service interface); and iv) optional information on the file format (perhaps to facilitate the format detection in the attachment adapter). The attachment adapter 174 reads the file from the knowledge management component 172 using a suitable interface, such as one that facilitates streaming or other expedited media communication.

The attachment adapter 174 may merge split or parsed files and convert XML into structured files. Rules for merging (or bundling) and conversion are normally application or business object-dependent. Often the adapter can delegate responsibility to format or application-specific handler classes. Afterwards, it passes the messages to the integration middleware agent 178. The enterprise application integration middleware 176 maps the message to the service interface. The inbound process agent 134a updates the business object instance. For example, inbound process agent 134a may update business objects associated with employees and/or W-4s if the employee W-4 information received is an update to existing information for an employee already on file. In another example, the inbound process agent 134a may create new business objects for information received for new employees or those not having W-4 information on file. The lifetime of the file input control technical object 132b ends, when the message has been sent. The file input control technical object 132b is typically a transient technical object.

If one or more errors are detected during the processing, it may happen that the incoming file has to be processed again and a new instance of the file input control technical object 132b may be created. The file content is then mapped to the exchange interface 174. As a result, the last attempt to upload the file results in the final state of the business object. By default, system 100 does not normally remove the file attachment or the file in the knowledge management component 172 unless it is triggered to do so by the application. Files can be archived, and when this occurs system 100 can leverage knowledge management component 172 features associated with attachment services.

When a file to be uploaded contains multiple business object instances, and the creation of those instances is supposed to happen during the file upload, there can be one business object that represents the collection of business object instances. For readability purposed, the description calls it an "application carrier business object." Accordingly, it is a collection of "application target business object" instances. It may also happen that the file is a collection of instances for different "application target business objects."

For example, a company payment file register may represent the payment file a cash manager receives to upload a large number of different types of payments. The purpose of the procedure is the creation of a multitude of payments. The file is uploaded as the attachment of the "application carrier business object." The attachment adapter 174 splits it and generates multiple outgoing messages. Each message creates one of the instances of the "application target business object." One additional message is sent to the update interface of the "application carrier business object." Its purpose is to notify the "application carrier business object" about the success of the file input. The success message is used to change the status of the "application carrier business object." It is recommended that the "application target business objects" will add an association to the "application carrier business object." Such associations may facilitate cleanup in case of failure and subsequent restart of the file upload. The association should be created only if the newly created instances of the "application target business objects" have awareness that they had been created by file upload. For that reason, the "application carrier business object" passes its instance ID to the file input control technical object 132b. The overall process is split into two parts: the file creation and the download by the user.

The file creation can be initiated either by a mass data run or by the user via the context component 131. In both cases, creation or modification of the business objects is followed by the request to create the file. The business object instantiates the attachment folder data object. The action of saving the file invokes the outbound process agent 134b. The outbound process agent 134b composes an asynchronous message that contains the business object data and the URL of the file. In this respect, the message structure for existing applications has to be extended to not only contain business object data, but also cover the file or folder URL. The message is sent to the integration middleware agent 178, which maps the message to the attachment adapter 174. The attachment adapter 174 converts the message format to the outbound file format and loads the file to the knowledge management component 172. Now the file is available for download.

In a separate step, the user downloads the file 150 from the knowledge management component 172 via the attachment pane in the work center. The file 150 remains visible as an attachment and can also be downloaded multiple times via multiple (often authenticated) users, such as if a download attempt fails due to a processing error. If the application requires or requests deletion of the file after download, it is normally initiated explicitly by the application according to any dynamic or static settings or intelligence. In this way, each file 150 containing data to be input or output can be treated as an attachment to an existing instance of the class of objects for which data can be updated or extracted, thereby acting as an integral part of the objects. File transfer from the user's front end file system into the system, or vice versa, is thus handled exactly like the transfer of other attachments.

For the data input (upload) case, corresponding to the previous example of uploading employee W-4 information, a user selects an instance of the class of objects for which data shall be loaded. The user creates an attachment to the object instance and uploads the file into the system, as the attachment's content (how to offer such functionality is well-known). The user executes some action that triggers processing the file in background, either immediately or at a later, scheduled time. The file remains available as an attachment to the object instance, though. The action executed by the user can be a "save" action in a transactional system or a dedicated action to start processing the file. In some implementations, system 100 can support several file formats for data input by detecting a concrete file's format—based on the context provided by the object instance to which the file is attached, and by searching for key words within the file content.

For the data output (download) case, a user executes an action that leads to the generation of a file in a background process. The generated file is stored as an attachment to the object instance initially chosen by the user. At any time later, the user can search for the right object instance (or the user is actively notified), and can, for example, transfer the attachment to a local file system or send it to another person via email. In some implementations, software can track the progress of processing an attachment file in the background using an appropriate status indication at the attachment or object instance level. For example, a user may employ displays within the GUI 136 to display the progress of a large transfer of employee W-4 information.

Server 102 may also include interface 117 for communicating with other computer systems, such as clients 104, over network 112 in a client-server or other distributed environment. Generally, interface 117 comprises logic encoded in software and/or hardware in a suitable combination and operable to communicate with network 112. More specifically, interface 117 may comprise software supporting one or more communications protocols associated with communications network 112 or hardware operable to communicate physical signals.

Network 112 facilitates wireless or wireline communication between computer server 102 and any other local or remote computer, such as clients 104. Network 112 may be all or a portion of an enterprise or secured network. In another example, network 112 may be a VPN merely between server 102 and client 104 across wireline or wireless link. Such an example wireless link may be via 802.11a, 802.11b, 802.11g, 802.20, WiMax, and many others. While illustrated as a single or continuous network, network 112 may be logically divided into various sub-nets or virtual networks without departing from the scope of this disclosure, so long as at least portion of network 112 may facilitate communications between server 102 and at least one client 104. For example, server 102 may be communicably coupled to repository 135 through one sub-net while communicably coupled to a particular client 104 through another. In other words, network 112 encompasses any internal or external network, networks, sub-network, or combination thereof operable to facilitate communications between various computing components in system 100. Network 112 may communicate, for example, Internet Protocol (IP) packets, Frame Relay frames, Asynchronous Transfer Mode (ATM) cells, voice, video, data, and other suitable information between network addresses. Network 112 may include one or more LANs, radio access networks (RANs), metropolitan area networks (MANs), WANs, all or a portion of the global computer network known as the Internet, and/or any other communication system or systems at one or more locations. In certain embodiments, network 112 may be a secure network associated with the enterprise and certain local or remote clients 104.

Client 104 is any computing device operable to connect or communicate with server 102 or network 112 using any communication link. At a high level, each client 104 includes or executes at least one GUI 136 and comprises an electronic computing device operable to receive, transmit, process and store any appropriate data associated with system 100. Some of these data are contained within attachments that are downloaded from, or uploaded to, applications 130 using methods described of this disclosure. It will be understood that there may be any number of clients 104 communicably coupled to server 102. Further, "client 104," "business," and "user" may be used interchangeably as appropriate without departing from the scope of this disclosure. Moreover, for ease of illustration, each client 104 is described in terms of being used by one user. But this disclosure contemplates that many users may use one computer or that one user may use multiple computers. In certain situations, users may include owners, bookkeepers, as well as third party or outside accountants. For the business owner, system 100 may provide or make available, for example, through client 104 and application 130: i) business status information (seven-day profit & loss report, daily bank statement); ii) customer information (contact information, recent purchases, payment history, credit report); and iii) product information (inventory levels, vendor information, unit cost). In another example, bookkeepers typically do invoicing, bill paying, payroll (whether directly or preparing data for a payroll service), reconciliation, general ledger and banking. For the bookkeeper, system 100 may provide or make available, for example, through client 104 and application 130: i) transaction documentation (purchase orders, sales orders, invoices, receipts); accounting basics (chart of accounts, accounts receivable, accounts payable, tax preparation); iii) human resources information (employee information, benefits tracking); and iv) banking activities (monthly statement reconciliation, business checking, business credit card transactions, customer credit card transactions). For outside accountants, system 100 may provide or make available, for example, through client 104 and application 130: i) a detailed, professional view of the business; ii) analytic tools to drill down to root causes of cash shortfalls or windfalls; iii) tools to project trends and test the effect of decisions; iv) sophisticated business reporting tools to summarize trends and status graphically for the owner; v) annotation tools for leaving notes in the books for the bookkeeper and for their own future reference; and vi) import and export from third party accounting or business software.

As used in this disclosure, client 104 is any person, department, organization, small business, enterprise, or any other entity that may use or request others to use system 100, namely application 130. For simplicity, client 104 may also be termed a client 104, which is intended to encompass a personal computer, touch screen terminal, workstation, network computer, kiosk, wireless data port, smart phone, personal data assistant (PDA), one or more processors within these or other devices, or any other suitable processing device used by or for the benefit of client 104. For example, client 104 may be a PDA operable to wirelessly connect with external or unsecured network. In another example, client 104 may comprise a laptop that includes an input device, such as a keypad, touch screen, mouse, voice recognition system, or other device that can accept information, and an output device that conveys information associated with the operation of server 102 or clients 104, including digital data, visual information, or GUI 136. Both the input device and output device may include fixed or removable storage media such as a magnetic computer disk, CD-ROM, or other suitable media to both receive input from and provide output to users of clients 104 through the display, namely the client portion of GUI or application interface 136.

Figure 8:
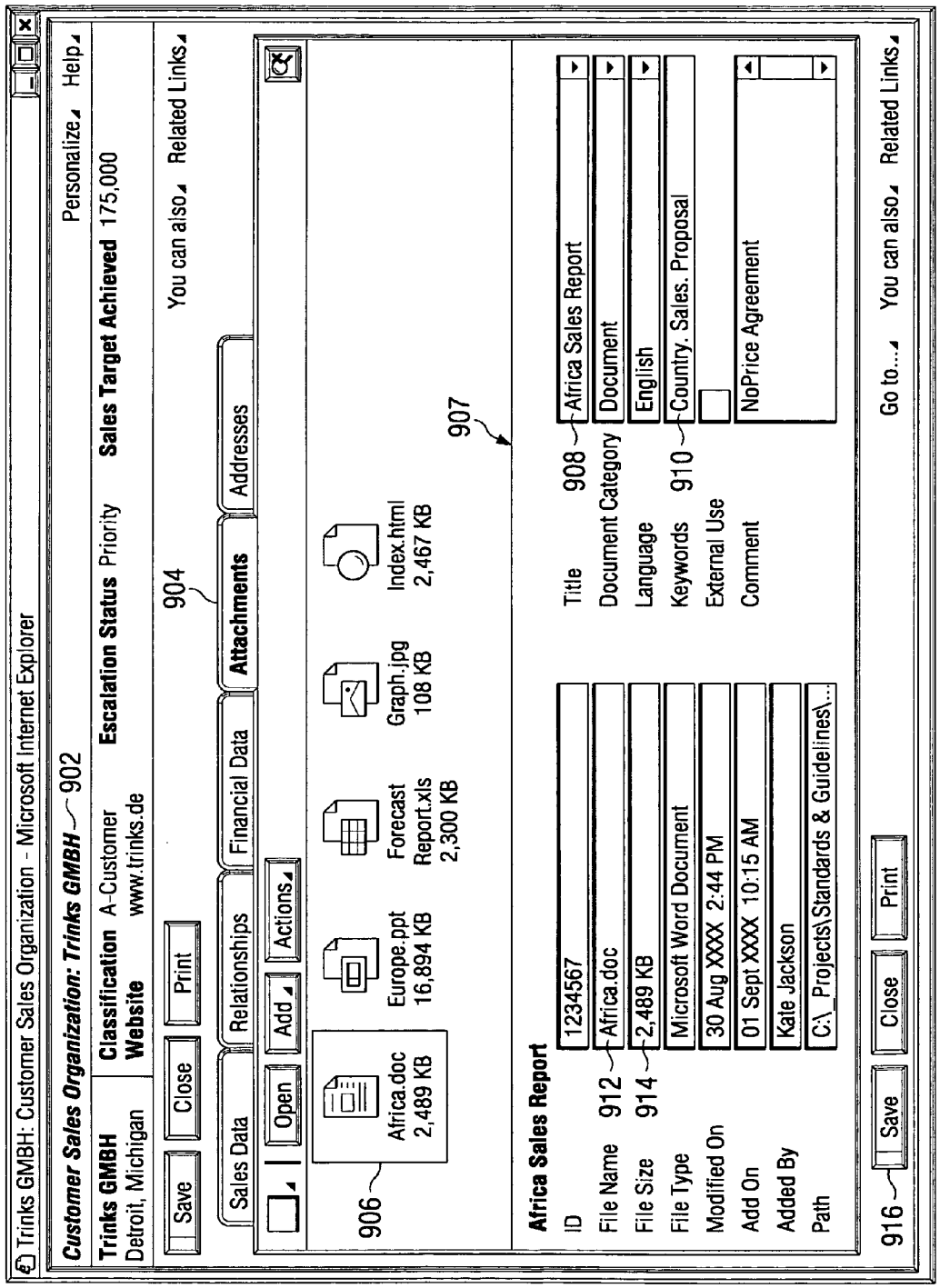
FIG. 8 illustrates an example user interface for implementing certain techniques and components and presenting results thereof in accordance with one embodiment of the system of FIG. 1.

GUI 136 comprises a graphical user interface operable to allow the user of client 104 to interface with at least a portion of system 100 for any suitable purpose, such as viewing application or other transaction data. Generally, GUI 136 provides the particular user with an efficient and user-friendly presentation of data provided by or communicated within system 100. As shown in FIG. 8, GUI 136 may comprise a plurality of customizable frames or views having interactive fields, pull-down lists, and buttons operated by the user. For example, GUI 136 is operable to display certain presentation elements 140 in a user-friendly form based on the user context and the displayed data. GUI 136 may also present a plurality of portals or dashboards. For example, GUI 136 may display a portal that allows users to view, create, and manage historical and real-time reports including role-based reporting and such. Generally, historical reports provide critical information on what has happened including static or canned reports that require no input from the user and dynamic reports that quickly gather run-time information to generate the report. Of course, reports may be in any appropriate output format including PDF, HTML, and printable text. Real-time dashboards often provide table and graph information on the current state of the data, which may be supplemented by presentation elements 140. GUI 136 is often configurable, supporting a combination of tables and graphs (bar, line, pie, status dials, etc.), and is able to build real-time dashboards, where presentation elements 140 (as well the displayed application or transaction data) may be relocated, resized, and such. It should be understood that the term graphical user interface may be used in the singular or in the plural to describe one or more graphical user interfaces and each of the displays of a particular graphical user interface. Indeed, reference to GUI 136 may indicate a reference to the front-end or a component of application 130, as well as the particular interface accessible via client 104, as appropriate, without departing from the scope of this disclosure. Therefore, GUI 136 contemplates any graphical user interface, such as a generic web browser or touchscreen, that processes information in system 100 and efficiently presents the results to the user. Server 102 can accept data from client 104 via the web browser (e.g., Microsoft Internet Explorer or Netscape Navigator) and return the appropriate HTML or XML responses to the browser using network 112, such as those illustrated in FIG. 8.

Figure 2:
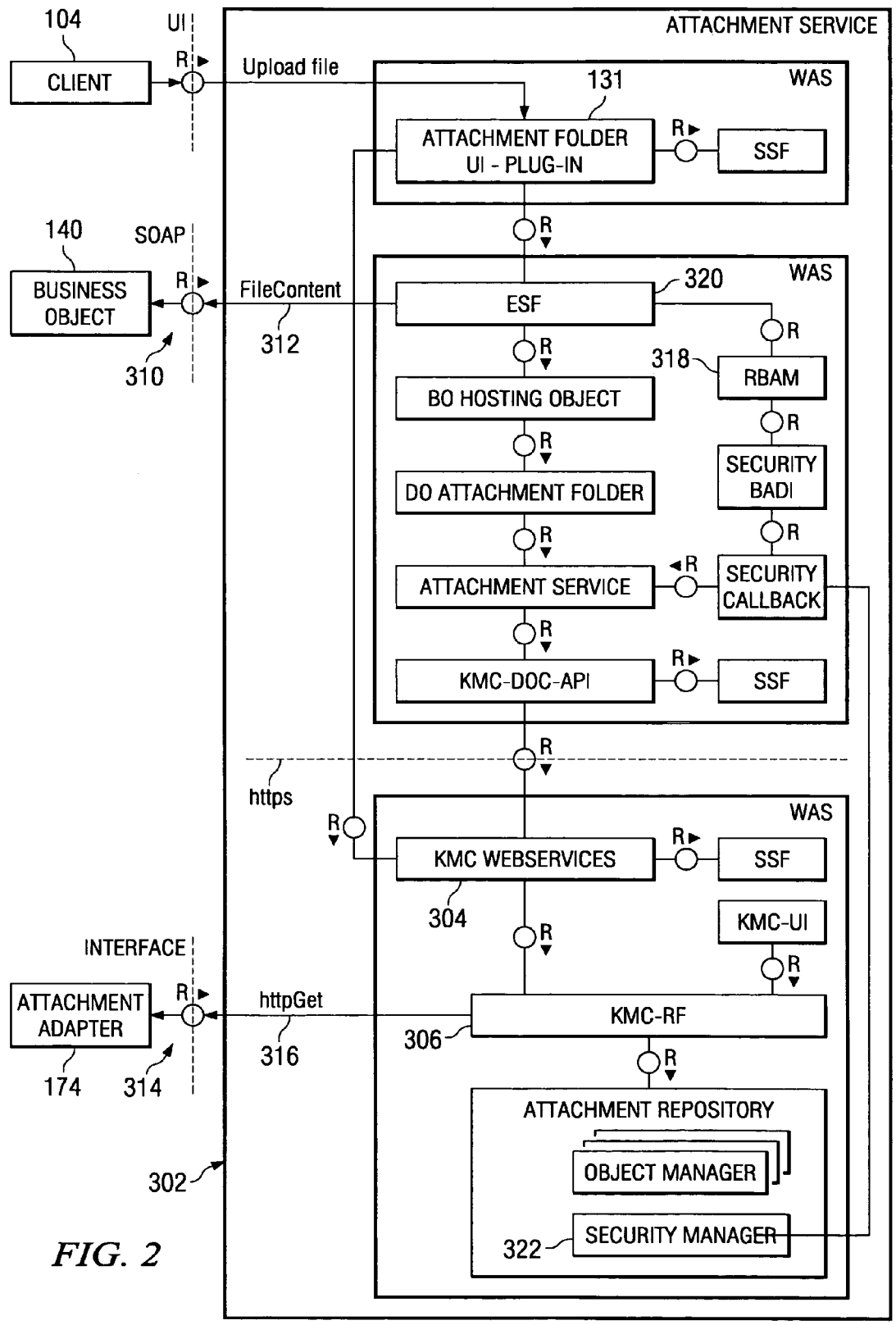
FIG. 2 illustrates a more detailed application implementing certain techniques and components in accordance with one embodiment of the system of FIG. 1.

FIG. 2 illustrates example interfaces of the involved components with an attachment service 302. The attachment service 302 provides enterprise services infrastructure interfaces to access files to be attached to business objects. The files themselves are stored in the knowledge management component 172. The enterprise services infrastructure interfaces in the ABAP stack of the application platform to access the files via the content management of knowledge management (KMC) web services 304 on top of the KMC repository framework (KMC-RF) 306.

Generally, an attachment folder plug-in 131 allows integration of the file upload and download into the UI based on the attachment folder dependent object 132a. It encapsulates the connection from the user's desktop to the framework 306. In certain cases, the attachment folder UI plug-in 131 also makes use of the enterprise services infrastructure interfaces. For example, the end user can upload or download the file 150 to or from the attachment service 302 via the user interface of the work center and the attachment folder plug-in 131. The UI can easily be extended to use the attachment service 302 via an available user interface building block (UIBB) attachment pane.

The business object instance retrieves the logical location (or URL) of the file 150 to pass it to the file input control technical object 132b. The enterprise services infrastructure interface of the business object provides access to the data object. The file content node 310 provides the URL that can be used to directly retrieve the document.

The attachment adapter 174 receives the file content 312 with the incoming trigger message. In this example, it makes use of interface 314 to the framework 306 to retrieve the file via an HTTP GET function 316 or upload the file via an HTTP PUT (not shown) respectively. The interface 314 is preferred with respect to the web services 304 because it supports streaming, whereas the web services 304 only allow block access.

The file 150 referenced in an attachment data object (or other dependent object) may be protected or otherwise secured via the RBAM (role based authorization management) security 318 of the hosting object when accessed via the enterprise service facility (ESF) 320. Since the documents may contain sensitive data (such as banking, personnel, or security profiles), backdoors via access outside ESF 320 may often be protected as well. Potential backdoors may include knowledge management specific (e.g., search) and direct access to folder. Since there are alternative ways to access the attachments directly from the framework 306, such as using the web services 304 and the interface 314, the attachment service 302 implements a security manager that performs a security callback into the ABAP stack to provide the same protection as if called via the enterprise services infrastructure. In this way, backdoors can be closed or monitored for appropriate use.

To provide authentication, the trigger message sent from the outbound process agent to the attachment adapter 174 is asynchronous and contains the link to access the file from the framework 306. Since the interface 314 protects the file with the RBAM 318 authorizations of the user that has initiated the file upload (or download), an authentication with the same user's or client's credentials may be required. For example, this is often considered at three places: i) the process agent attaching a logon ticket to the trigger message; ii) the exchange infrastructure adapter framework using the logon ticket; and iii) the interface 314 accepting ticket authentication.

The integration middleware thread that processes the incoming message first stores the message in the database. During this step it consumes the ticket. The next thread has to issue a new ticket via a JAVA destination service. This typically happens based on the current user of the thread. In some implementations, a "principal propagation" feature can be used to help ensure that subsequent threads run under the same user. Without such a feature, a less secure workaround via a communication user with access rights to all attachments could be implemented.

The attachment adapter 174 connects the framework 306 to the enterprise application integration middleware 176. Its main tasks in the file upload case are: file retrieval from the framework 306, splitting of large files, conversion of structured files to XML, and passing XML file fragments to enterprise application integration middleware 176. In the file download case, the tasks are: receive XML message from enterprise application integration middleware 176, convert message into outbound file format, and store file in the framework 306. The attachment adapter 174 is a plug-in in the integration middleware adapter framework. The integration middleware adapter framework allows flexible extensions to connect systems to the integration middleware that do not comply with the integration middleware-compatible XML format.

Figure 3:
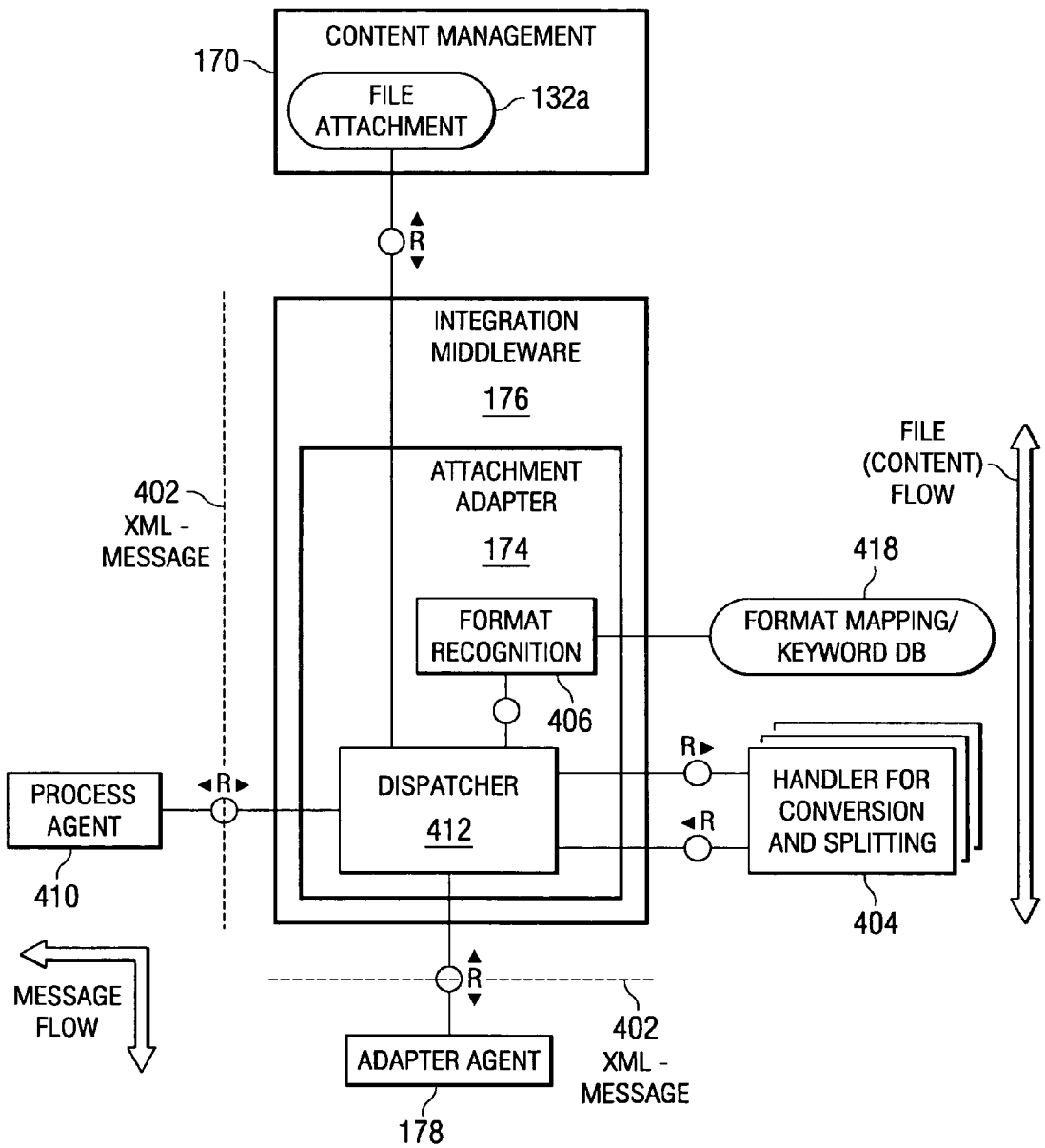
FIG. 3 illustrates an example internal architecture of the attachment adapter.

FIG. 3 illustrates an example internal architecture of the attachment adapter 174. This example integration middleware adapter 178 may require an XML message 402 or some other easily processable (or extensible) message. For example, if the file is in a structured format, it may first be converted to XML. The conversion is often dependent on or more efficiently processed based on the type of data (e.g., payroll, banking, and so forth) and/or the format of the data it receives. In those cases, the actual conversion is typically performed in handler classes 404 for each format.

Splitting of large files may occur for more efficient or concurrent processing as appropriate. Such utilization may be based on any static or dynamic thresholds, which may indicate a lower end of an expected value (such as available memory), may indicate an upper limit (such as file size), or a flag that triggers the parsing (such as a particular file type or format). For example, application 130 may automatically split the file if the XML mapping in integration middleware would consume a large amount memory, perhaps at a busy time for the system or application. In this example, although precise memory limits can vary, the file may be compared to some large file size thresholds (e.g., more than 30-50 Mbytes) to achieve an acceptable performance. For that reason, the KM Adapter may thus split or parse larger files into smaller pieces. In certain embodiments, the splitting algorithm depends on or utilizes the format of the received file 150. Ideally, the smaller pieces would occur such that fragments retain syntactically correct XML. However, in the case of CSV-formatted files, cuts may not split single lines in many circumstances. Also, the sequence of the fragments may be important for some types of data. These fragments may each be handled by the particular invoked handler classes 404.

Returning to the conversion, handler classes 404 aid in the conversion and splitting for specific input formats. In this way, the specific requirements of the different data types can be taken into account. Default handler classes 404 can exist for common data types. However, other handler classes 404 may be highly application dependent. Handler classes 404 may also rely on globalization requirements such as language dependent output or regional differences in the format of the output file.

The interface of the file input control technical object 132*b* allows specification of the destination business object and the sender business object instance. There can also be an option to specify the format if already known. This information can be used to narrow down the format. If not available or not sufficient, the incoming file can be parsed for keywords at the first 10 Kbytes. The keywords can be used to determine the format, to more efficiently load and invoke the corresponding handler classes. For example, such key words may specifically identify the format, be header words known to be associated with a particular format, and so forth. The format recognition component 406 may also make use of the file extension (such as .XSL, .DOC, and so forth) to determine the file type.

A format mapping/keyword database 408 contains keywords that can be used to identify the format. For each format, the handler classes 404 for conversion and splitting can be specified using a namespace ID and an interface name. The table content can be deployed together with the handler classes 404. System 100 may store the mapping information in a data base, or the keyword mapping may be stored as XML files in the knowledge management component 172.

The attachment adapter 174 is triggered by an incoming message. The same attachment adapter 174 can be used for file input and output. In the case of file input, the message originates from an outbound process agent 410. In the case of file output, the message originates from the integration middleware adapter 178 and contains the business object data to be converted into an outgoing file. A dispatcher 412 orchestrates the knowledge management access and the format mapping, and calls the handler classes 404 for conversion and splitting.

Figure 4:
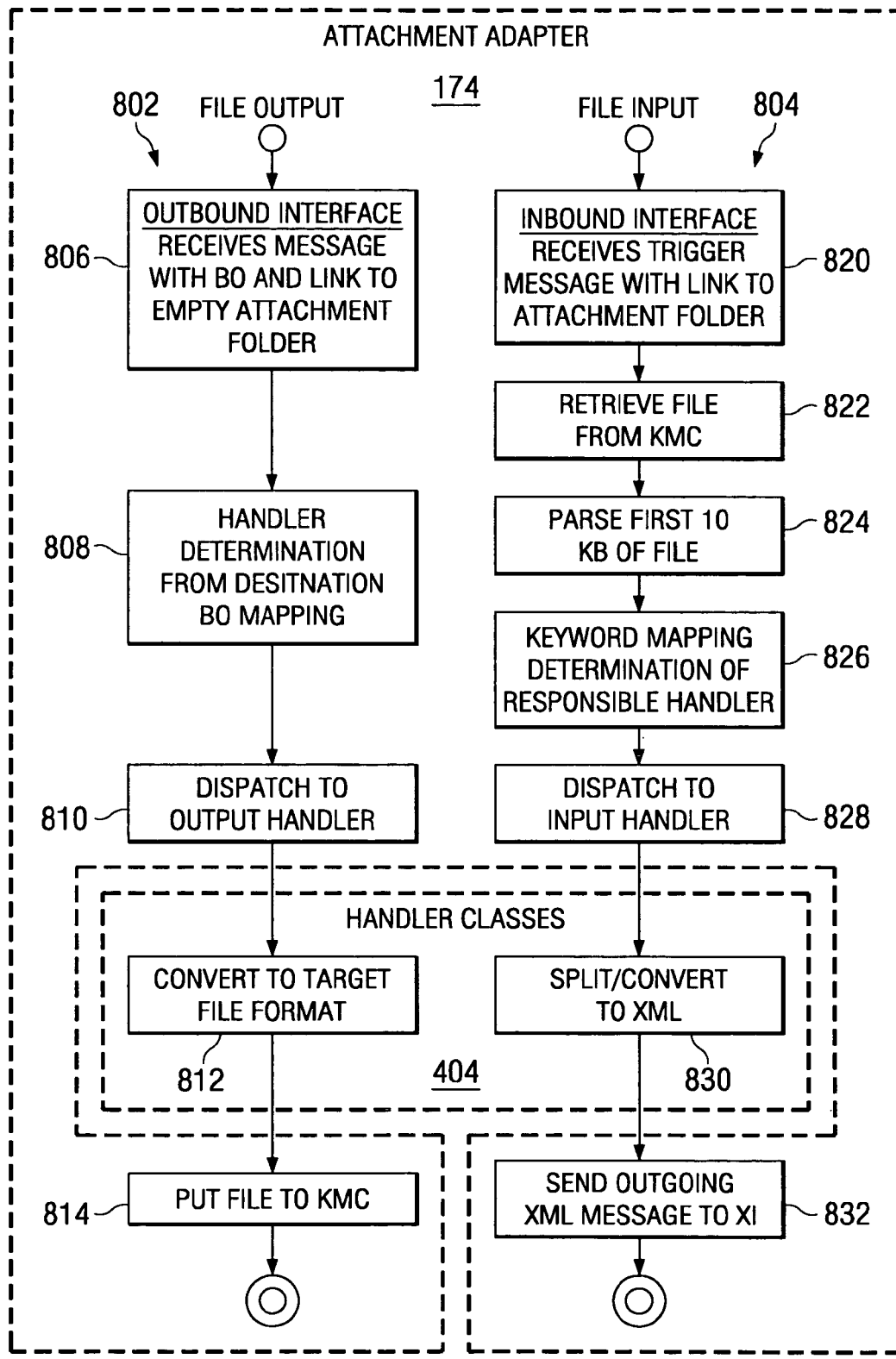
FIG. 4 illustrates example logical flows for outbound and inbound interfaces.

FIG. 4 illustrates an example logical flow 802 and 804 for outbound and inbound interfaces, respectively. Both logical flows 802 and 804 employ similar functionality provided by the attachment adapter 174 and the handler classes 404. The outbound logical flow 802 commences when the attachment adapter 174 receives a message with a business object and a link to an empty attachment folder in step 806. The message contains the business object data in XML format plus a reference to the still empty attachment folder.

For example, the business object 140 can be a sales report or the process that created the sales report. In particular, FIG. 8 shows an example GUI screen 902 which includes an attachments tab 904 for downloading an Africa.doc file 906. The GUI screen 902 includes a summary area 907 that displays detailed information about the file 906. Such a summary area 907 can display information about inbound and outbound attachments, as well as be used to input data for those attachments. For example, the detailed information can be specific to a sales report business object defined for the system. As mentioned above with respect to business object relationships depicted in FIG. 7, the Africa.doc file 906 can correspond to a single sales report or several sales reports, to name a few examples. The purpose of this step of the current example is to assign the Africa.doc file 906 to an empty attachment folder (not pictured) using an interface similar to the one here for selecting the file to be attached.

Returning to illustrated outbound logical flow 802, the attachment adapter 174 uses the business object mappings to determine the handler classes 404 to complete the download at step 808. For example, the handler classes in the current example are based on the sales report business object. Referring to FIG. 8, the summary area 907 can contain a title field 908, identifying the title of the sales report as "Africa Sales Report," and keywords 910, such as "Country, Sales, Proposal." In step 810, the attachment adapter 174 dispatches the output handler, providing the data for the file download. For example, for an outbound interface, the summary area 907 can contain a file name field 912, containing a value such as "Africa.doc."

The system 100 uses the handler classes 404 in step 812 to convert and return the file in the format for the particular outbound interface. The format corresponds to the corresponding business object(s) associated with the outbound interface. For example, in formatting the Africa.doc file 906, the handler classes 404 can use information within system 100 related to the sales report business object. In step 814, processing control is returned again to the attachment adapter 174 which transmits the outbound file to the knowledge management component 172. For example, in the current example, the outbound file is the Africa.doc file 906. An update message is sent to back to the initiating business object instance as a confirmation. A completion message may then be sent to the particular handler class 404.

The inbound logical flow 804 is similar to the outbound logical flow 802 and commences when the attachment adapter 174 receives a trigger message with a link to an attachment folder in step 820. The attachment folder contains a link to a file that has been received by the knowledge management component 172. For example, referring to FIG. 8, an attachment folder accessible on the screen 902 via the attachments tab 904 can contain a link to a file 906 such as "Africa.doc." The summary area 907 may also display detailed information about the file 906. In step 822, the attachment adapter 174 retrieves the file from the knowledge management component 172. Identification of the file, such as the "Africa.doc" file 906, is facilitated by a link to the file in the attachment folder.

In step 824, the attachment adapter 174 parses a representative portion of the file (e.g., the first 10 kilobytes of the file), searching for keywords that can help to identify the associated business objects corresponding to the data in the file. For example, the attachment adapter 174 may look for keywords similar to keywords 910, such as "Country, Sales, Proposal," in the file. In some implementations, the attachment adapter 174 may further parse the file's title 908 (e.g., "Africa Sales Report") in searching for keywords that may indicate the file's content.

In step 826, the attachment adapter 174 uses the keywords it found in the previous step to determine the responsible handler corresponding to the keywords found in the previous step. For example, if the attachment adapter 174 finds keywords similar to keywords 910 such as "County, Sales, Proposal," it can determine that the handler class responsible is one relating to sales reports. In step 828, the attachment adapter 174 dispatches the input handler, providing the data for the file upload. For example, for an inbound interface, the summary area 907 can identify "Africa.doc" as the file name 912 of the file being uploaded.

In step 830, one or more of the handler classes 404 splits the file (e.g., if necessary due to its size) and converts the file (or its constituent parts) to XML. For example, referring to FIG. 8, handler classes associated with sales report business objects can split the "Africa.doc" file 906 (if necessary, based on file size constraints) and convert the files to XML to make them consumable for subsequent steps. The summary area 907 may contain a file size field 914 that can indicate the file size of the file 606 in an attachment.

In step 832, the attachment adapter 174 sends an outgoing XML message to the integration middleware agent 178. The message flow goes through the outbound process agent 134b. The user of the system 100 may eventually complete the process of a file upload process characterized by the inbound interface steps 804 by selecting a control 916, such as a "Save" button, on the screen 902, triggering a save operation that incorporates the file into the system 100.

Regardless of the particular hardware or software architecture used, business application 130 (and the various attachment-based components, whether internal, linked, or distributed) is generally capable of managing at least a portion of business objects 140, associating one or more data files 150 with one or more business objects 140 as appropriate, and executing various other related attachment-based data input and output processes and techniques. Some of these processes are illustrated in certain flowcharts described below. The following descriptions of the flowcharts focus on the operation of business application 130 in performing or executing the respective method. But system 100 contemplates using any appropriate combination and arrangement of software elements implementing some or all of the described functionality. For example, some of the processing or other techniques may be implemented by attachment adapter 174, attachment service 302, or other invoked or referenced libraries or sub-modules whether or not illustrated and whether alone or in combination.

FIG. 5 is a flowchart illustrating an example method 500 for processing a file upload as implemented by application 130. Generally, this technique may be executed or initiated automatically based on the business process being performed for client 104 or at the request of the particular user. For example, application 130 may automatically upload a file when the file is received. Illustrated method 500 begins at step 502, where application 130 receives a request from a client to upload a data file associated with a business object. For example, the request, originating from a GUI 136, may be to upload a file containing one or more sales reports.

Once the client request is received, application 130 may then identify the business object's associated dependent object at step 504. For example, if a file to be uploaded contains sales reports, as represented by application business objects 140, the application can identify the corresponding attachment folder data object 132a. Having identified the dependent object, application 130 updates the business object with a message in a format associated with the business application at step 506. Such a format is based on the data file referenced in the dependent object. For example, application 130 can update the application business object 140 associated with sales reports with a message indicating the existence of a sales report file received from the GUI 136. Once the application business object 140 is aware of the file, application 130 may communicate the logical location of the data file 150, whether in absolute or relative terms, to enterprise application integration middleware 176 at step 507. As described above, the enterprise application integration middleware 176 (when present) is logically situated between the business application 130 and the remote repository 135. For example, application 130 can identify the location the data file containing sales reports of the current example. Such a location could then be easily accessible by the enterprise application integration middleware 176 and kept in memory, stored off for subsequent retrieval, or otherwise processed as appropriate.

Next, at step 508, application 130 receives the data file 150, perhaps via enterprise application integration middleware 176. Application 130 may then determine if the received data file 150 is in XML format or the format already expected by application 130 at decisional step 509. If it is, then processing proceeds to step 518 described below. But if the file 150 is a non-native or unexpected format, then application 130 then determines if the size of the generated file exceeds an (often predetermined) threshold at decisional step 510. If the file does not exceed some threshold at decisional step 510 (or if one does not exist, is not applicable to this file type, etc.), then application 130 may convert the entire file 150 to an XML message format at step 511 and maps the XML message to the format associated with the corresponding business application at step 512. For example, the integration middleware agent 178 can receive a generated file containing sales report information from the content management service 170 of the knowledge management component 172. The attachment adapter 174 retrieves the file, converts the file to an XML message format using handler classes 404, and maps the XML message representing the sales order file to the corresponding format of the application 130.

But if the file does exceed (or otherwise violate) some threshold or runtime parameter, then application 130 parses the file into smaller pieces at step 514. Otherwise, method 500 proceeds to step 518. But if the file is parsed into smaller pieces at step 514, then application 130 coverts each piece of the data file into XML (as appropriate) at step 515, maps each of the smaller pieces to a format associated with the application 130 at step 516, and updates the business object for each of the smaller piece at step 517. For example, if the result of step 514 is a set of sub-files of the original sales report file to be uploaded, application 130 maps each of the sales report sub-files to the application business object 140 corresponding to sales reports. Of course, application 130 may use any intelligence, multi-tasking capabilities, or sorting to more quickly process each of these pieces.

After the one or more pieces of the file are mapped at optional step 510 or step 516, application 130 executes a user-initiated save request at optional step 518. For example, the user can select a control, such as a "Save" button, on the GUI 136 to store the uploaded sales report file on the server 102. During the save operation, the inbound process agent 134a updates the application business object 140. Depending on the business object and how its data is stored, updating the business object may involve creating or updating rows in one or more relational data base management system (RDBMS) tables, adding or replacing elements in one or more flat files, or updating metadata about data stored in various formats, to name a few examples.

FIG. 6 is a flowchart illustrating an example method 600 for processing a file download as implemented by application 130. As with method 500, this technique may be executed automatically based on the business process being performed for client 104 or at the request of the particular user. In other words, method 600 may be executed automatically as part of a mass data run, report, batch job, and so forth or it may be requested by a user at client 104. For example, method 600 begins at step 602, where application 130 receives a request, which may be used to identify a business object in the business application 130, for this download. In particular, the request may originate from GUI 136 when a user of client 104 selects a business object from a collection of business objects for which data file downloads are available. For example, the user may select the business object in order to download a specific sales report regarding customers in Africa. This collection of available business objects 140 may be limited or filtered based on the user's context profile 145 and other security settings. The request may also be received from another application running on client 104, from a sub-module within application 130, or some other software component. At step 604, application 130 instantiates a dependent object, such as an outgoing process agent, using the business object 140 identified in the previous step. Returning to the earlier example, if the user has initiated the process to download an Africa sales report, then an attachment folder dependent object 132a dependent object created.

After the dependent object has been instantiated, then application 130 sends a business object message to the attachment adapter 174 via the dependent object at step 606. Typically, this message includes or references data in a format associated with the object or, more generally, application 130. Next, at step 608, application 130 converts the included or referenced data from the format associated with business object to a second format when appropriate. For example, application 130 might access the business object XML-formatted message containing sales report data and convert the data to a second format, whether flat files, RDBMS tables, or other. This second format may be statically determined based on the user context profile 145, the requesting application, required file formats for particular data types or communication channels, and so forth. Also, this second file type may be dynamically determined according to any suitable run-time parameters.

Having converted the data to another suitable format, application 130 may then store the reformatted data file 150 at step 610. Such storage of the file 150 often occurs at the previously determined or generated logical location and allows for subsequent processing by this or other users, as well as retrieval or requesting by other applications. Further, this archival of the reformatted message may allow for later auditing of the data. In the current example, the reformatted data file containing Africa sales report data can be stored in the previously-generated URL.

The preceding flowchart and accompanying description illustrate exemplary methods 500-600. System 100 contemplates using or implementing any suitable technique for performing these and other tasks. It will be understood that these methods are for illustration purposes only and that the described or similar techniques may be performed at any appropriate time, including concurrently, individually, or in combination. In addition, many of the steps in this flowchart may take place simultaneously and/or in different orders than as shown. Moreover, system 100 may use methods with additional steps, fewer steps, and/or different steps, so long as the methods remain appropriate. For example, as hardware capabilities and size increase, then the parsing threshold may dynamically be increased as well. In other words, if the system administrator adds file space to the particular repository, then system 100 may automatically increase the threshold or remove it entirely. In another example, system 100 may not convert the particular file to a more generic language if it determines that such conversion is either unnecessary or less efficient based on various runtime parameters and system settings.

Although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. An article comprising a non-transitory machine-readable storage medium storing instructions for interactive, attachment-based data management, the instructions operable to cause one or more computers to:

receive a request from a logically remote client via a network interface, the request indicating a data file and a business object associated with a business application, the business object comprising at least one object attribute, the business object separate and distinct from the data file;

update the business object with a message in a format associated with the business application based on the data file, the message referencing a logical location of the data file;

map at least a portion of the data file to at least one keyword associated with the business object;

identify, based on the mapped portion of the data file, a handler object communicably coupled to an integration middleware logically situated between the business application and a remote repository;

store the data file in the remote repository; and update a dependent object associated with the business object with a logical location of the data file in the remote repository.

2. The article of claim 1, wherein updating the business object with the message comprises communicating the logical location of the data file to the integration middleware, the integration middleware mapping the data file to the format associated with the business application.

3. The article of claim 2, the integration middleware further operable to:

receive the data file from the remote repository via streaming;

convert the data file to an XML message; and map the XML message to the format associated with the business application.

4. The article of claim 3, the integration middleware further operable to parse the data file into smaller pieces if the data file is larger than a particular threshold.

5. The article of claim 4, the integration middleware converting the data file, mapping the XML message, and updating the business object for each piece of the parsed data file.

6. The article of claim 2, the integration middleware automatically invoking the handler object for the particular data file based on the mapped portion of the data file.

7. The article of claim 6, the mapped portion of the data file indicating a file extension of the data file.

8. The article of claim 2, the instructions further operable to cause one or more of the computers to communicate an instance identifier of the business object and a type of the data file.

9. The article of claim 1, the instructions further operable to cause one or more of the computers to execute a user-initiated action comprising a save request on the business object to initiate the storage of the data file in the remote repository.

10. The article of claim 1, the remote repository comprising a logically remote repository and the logical location comprising a relative URL.

11. The article of claim 1, the business object comprising a carrier object referencing a plurality of child business objects and the instructions further operable to cause one or more of the computers to update the child business objects using the carrier object.

12. An article comprising a non-transitory machine-readable storage medium storing instructions for interactive, attachment-based data management, the instructions operable to cause one or more computers to:

automatically identify a business object in a business application based on a received request, the business object comprising at least one object attribute;

instantiate a dependent object using the business object, the dependent object storing a logical location for a data file associated with the business object, the data file being separate and distinct from the business object and dependent object;

map at least a portion of the identified business object;

identify a handler object based on the mapped portion of the identified business object;

convert, via the handler object, a business object message in a format associated with the business application to a second format, the business object message referencing the data file; and store the converted message at the logical location as the data file in the second format.

13. The article of claim 12, the instructions further operable to cause one or more of the computers to dynamically select the second format from a plurality of formats.

14. The article of claim 12, the instructions further operable to cause one or more of the computers to:

receive a request from a client for the data file via the business object; and communicate the data file from the logical location to the client at least partially using the dependent object.

15. A file server for interactive, attachment-based data management comprising:

memory storing a plurality of instantiated business objects according to a business application; and one or more processors:

receiving a request from a logically remote client via a network interface, the request indicating a data file and one of the business objects associated with the business application, each business object comprising at least one object attribute, the business object separate and distinct from the data file;

updating the business object with a message in a format associated with the business application based on the data file, the message referencing a logical location of the data file;

mapping at least a portion of the data file to at least one keyword associated with the business object;

identifying, based on the mapped portion of the data file, a handler object communicably coupled to an integration middleware logically situated between the business application and a remote repository;

storing the data file in a logically remote repository from the business objects; and updating a dependent object associated with the business object with a logical location of the data file in the remote repository.

16. The server of claim 15, the one or more processors mapping the data file to the format associated with the business application.

17. The server of claim 16, wherein mapping the data file comprises the one or more processors:

receiving the data file from the remote repository via streaming;

converting the data file to an XML message; and mapping the XML message to the format associated with the business application.

18. The server of claim 17, the one or more processors parsing the data file into smaller pieces if the data file is larger than a particular threshold.

19. The server of claim 18, the one or more processors converting the data file, mapping the XML message, and updating the business object for each piece of the parsed data file.

20. The server of claim 15, the one or more processors automatically invoking the handler object for the particular data file based on the mapped portion of the data file.

21. The server of claim 20, the mapped portion of the data file indicating a file extension of the data file.

22. The server of claim 15, the one or more processors executing a received user-initiated action comprising a save request on the business object to store the data file in the remote repository.

23. The server of claim 15, the business object comprising a carrier object referencing a plurality child business objects and the one or more processors updating the child business objects using the carrier object.

* * * * *